Patented Mar. 13, 1923.

1,448,512

UNITED STATES PATENT OFFICE.

GEORGE HILLARD BENJAMIN, OF NEW YORK, N. Y.

METHOD OF DEHYDRATING VEGETABLE, ANIMAL, AND OTHER MATERIALS.

No Drawing.   Application filed September 27, 1918.   Serial No. 255,964.

*To all whom it may concern:*

Be it known that I, GEORGE HILLARD BENJAMIN, a citizen of the United States, residing at New York, in the county and State of New York, have invented a certain new and Improved Method of Dehydrating Vegetable, Animal, and Other Materials, of which the following is a specification.

It is a well recognized fact that different types of vegetables, as well as different types of materials of animal origin, differ widely in the arrangement of, the thickness of the walls of, and the general characteristics of the cell structure. The above fact materially affects not only the rapidity of the withdrawal of the fluid contained within the cells, in the process of dehydration, but the rapidity with which water will subsequently be reabsorbed into the cells. Further, vegetable substances carry coloring matter, which coloring matter, unless "set" in some manner, is destroyed, i. e., "bleached out" in the process of dehydration. Materials of animal origin, carry chemical bodies, which, in the process of dehydration, change their form, as for instance, iron, which unites with oxygen to produce a dark color in the body treated.

The object of my invention is to so treat the materials to be dehydrated, both preliminary to dehydration and during dehydration, first, as regards vegetables, the vegetable materials when mixed, as in the production of "soup vegetables," will reabsorb water at the same rate, and further, will maintain their natural color; second, as regards materials of animal origin, there will be no coaction between the constituents of the air used in effective dehydration and the chemical bodies carried by the material treated, and thus discoloration is prevented.

In the case of vegetables, the preliminary treatment is as follows: The vegetables, when tubers, are divided into cossettes; when leaves, shredded or divided into small pieces. They are then subjected to a blanching process. The blanching process may vary, both as to character and time. With tubers, the cossettes immediately on being cut, are discharged into a vessel of water carrying a small amount of salt or a vegetable acid, preferably acetic acid. I find that a solution of salt and water of four grains to the gallon, or acetic acid, fifteen drops to the gallon, with the solution maintained at approximately 150° F. with the time of immersion not to exceed four minutes, is sufficient. The effect of the immersion is to kill any bacteria which may be present, and prevent discoloration. With leaves, such for instance as lettuce and spinach, I use in place of the salt or acetic acid, a solution of bicarbonate of soda in water, the solution in strength being approximately six grains to the gallon, and the temperature maintained at 150° F., and the time of immersion two minutes. With beets, which differ somewhat from either tubers or leaves, I use a body of hot water maintained at a temperature of 150° F., with the time of immersion twelve minutes. I do not in any wise limit myself to the strength of the solution above mentioned, or to the time of immersion, as both the strength and the time will vary according to the characteristics of the vegetables. If the vegetables are very fresh, the solution may be weaker, and the time of immersion shorter; if the vegetables are old and hard, the strength of the solution should be increased and the time of immersion lengthened. I prefer that the temperature of the bleaching solution should not exceed 150° F. If the temperature is increased over 156° it tends to coagulate the vegetable albumens, which is objectionable. It may be between 140° and 152°, but 150° is apparently the best. The effect of using the soda solution is to set the color in the vegetables. By experiment I find that I can materially reduce the strength of the soda solution; in fact, the soda in the solution may be entirely omitted if the vegetables to be dehydrated are exposed, during dehydration, to the concentrated effects of electric light. Electric light has the property of developing and fixing the color. After the vegetables are subjected to the preliminary treatment, as above described, they are introduced into the dehydrating apparatus and primarily subjected to the action of radiant heat, the temperature obtained and maintained being preferably not to exceed 150° F.

After the vegetables are subjected to this temperature and effects of the radiant heat, which causes them to exude a portion of the contained moisture, air currents are caused to flow over them, the air currents heated to approximately 155° F. and having an absorbing capacity for moisture dependent upon the percentage of moisture which it is desired to extract within a given time or with a given rapidity. In practice I find that it is not advisable to use an air current, the capacity of which is over 25% below saturation, and for the reason that if the exuded water is picked up too rapidly, the tendency is to harden the surface of the material acted upon, or in other words, produce a skin which tends to prevent free exudation of the moisture from the body acted on. The length of time during which the air currents are continued, depends altogether upon the materials treated; with some materials, from one to two hours is sufficient; with others, from four to five hours. Rapidity of action may be increased by first subjecting the materials to the action of radiant heat, then to the action of partially dehydrated air currents, again to the action of radiant heat and again to air currents. The temperature of the air currents and percentage of humidity carried by the air currents may be varied according to the materials treated. In any case, it is desirable to carry the dehydration to a point where the water remaining in the material treated is reduced to approximately 10% of the normal water, or in other words, to a point where the remaining water, plus such water as may be absorbed after dehydration, will not be sufficient to coact with the enzyme present to effect fermentation.

With materials of animal origin, the preliminary treatment consists of introducing the materials into a solution of hot water and salt, the solution having the strength of approximately ten grains of salt to the gallon, after which the material is dried in a centrifugal machine to remove as much surface moisture as possible. The material is then immersed in a bath of an oil, preferably a slow drying oil, such, for instance, as is derived from the soya bean. After the preliminary treatment the material, covered with oil, is then placed in the dehydrating apparatus and subjected to the action of radiant heat. The radiant heat has the effect of causing exosmosis or exudation of the contained moisture, the moisture passing from the cells of the material through the oil covering and appearing upon the outer surface of the oil. After the material has reached a temperature of 150° F., dehydrated air currents, as in the case of vegetables, are passed over it for the purpose of absorbing the water on the surface of the oil. When the water is absorbed, the material is again subjected to the action of radiant heat, more water being exuded, and this water absorbed by air currents as before. The purpose of the oil is two fold: first, to prevent drying of the surface of the material of animal origin and thus producing a skin which tends to prevent exudation of water from the cells outward, and second, to prevent contact between the dehydrated air currents passing over the material under treatment and the chemical materials, as for instance, the iron of the blood, carried by the animal material. The time required for dehydrating the material will depend upon the thickness of the portions of material of animal origin treated. If the material is shredded, dehydration will be effected in not over three hours; if in the form of slices, the time required will be longer.

In treating sliced tubers or sliced material of animal origin, it is preferable that the slices be arranged at an angle to the horizon and not placed one upon the other. If placed one upon the other, they tend to stick together and prevent the access of air currents over the surface. Where arranged at an angle, the air currents find their way up through the slices and the effect is very much better and more rapid. Tubers may be treated with oil, as in the case of material of animal origin, to material advantage. Soya oil has a high protein value. It has practically no taste and does not discolor, with any temperature to which it is subjected in a dehydrating apparatus. Further, when the dehydrated materials are placed in hot water for reabsorption of water to bring them to their natural state and for cooking, the oil used rises to the surface of the vessel in which the materials are cooked, and may be skimmed off. The vegetables produced according to the process above described, retain their color and flavor, and may be restored to their normal condition as regards taste, smell and appearance by immersion in warm water. The materials of animal origin will be returned to their normal condition as regards appearance, taste and color, but improved over their normal condition, as regards tenderness. The action of the soya oil seems to be in a sense digestive, in that the treated material is more tender and succulent than the fresh raw material.

All of the materials above described, may be preserved any length of time, in suitable containers. The containers should be such, that the material carried in the container will absorb moisture very slowly. All dehydrated materials will remain in good condition if protected as against the deposit of bacterial matter and against the absorption of water beyond the point where the water present will coact with the enzyme. In practice I find that it is preferable to pack the materials in cardboard boxes while hot, and expose them to a temperature of approximately 190° F. before sealing down the covers. As a further measure of precaution, the box may be covered with a very light lead foil, or an extremely thin coating of a condensation product of phenol and formaldehyde, in the nature of a varnish. Pastes, even if they have incorporated with them a disinfectant material such as salicylic acid, are objectionable. Paraffin papers are objectionable, as they form culture beds for bacterial growth, particularly in moist climates.

Having thus described my invention, I claim:

1. The method of dehydration herein described, which consists in subjecting the material to be dehydrated, first to a preliminary treatment adapted to destroy any bacteria present, then to the action of radiant heat to cause an exudation of not over 95% of the contained water, and then to the action of dehydrated air currents for the purpose of absorbing the exuded water.

2. The method of dehydration herein described, which consists in subjecting the material to be dehydrated, first to a preliminary treatment adapted to give the different ingredients of the material the same absorptive capacity for warm water, then to the action of radiant heat to cause an exudation of the major portion of the contained water, and then to the action of dehydrated air currents for the purpose of absorbing the exuded water.

3. The method of dehydration herein described, which consists in subjecting the material to be dehydrated, first to a preliminary treatment to fix the normal color of the ingredients of the material treated, then to the action of radiant heat to cause an exudation of the major portion of the contained water, and then to the action of dehydrated air currents for the purpose of absorbing the exuded water.

4. The method of dehydration described which consists in subjecting the material to be dehydrated, first to a preliminary treatment to destroy any bacteria present, and fix the normal color of the material treated; then to the action of radiant heat to cause an exudation of a portion of the contained water, and then to the action of dehydrated air currents, for the purpose of absorbing the exuded water.

5. The method of dehydration herein described, which consists in subjecting the material to be dehydrated, first to a preliminary treatment to destroy any bacteria present, then removing any surface water, then immersing the material under treatment in a protective covering, then to the action of radiant heat to cause an exudation of the major portion of the contained water through the protective covering, and then to the action of dehydrated air currents for the purpose of absorbing the exuded water.

6. The method herein described, of treating materials to obtain a product which, when dried and subsequently immersed in water, will present the normal color of such product, which consists in first drying the material, then covering such material with a light oil such as soya oil, then heating the material to set up exudation of the major portion of the contained water, and then passing dehydrated air currents over the material for the purpose of absorbing the exuded water.

7. The method of dehydration herein described which consists in subjecting the material to be dehydrated, first to a solution of acetic acid in water, then to the action of heat to cause a partial exudation of the contained water, and then to the action of heat and dehydrated air currents to cause partial exudation of the contained water and absorption of all exuded water by the air currents.

8. The method of dehydration herein described, which consists in subjecting the material to be dehydrated, first to the action of a body which will destroy bacteria and heat of approximately 150° F., then to the action of radiant heat to cause an exudation of the major portion of the contained water, and then to the action of dehydrated air currents for the purpose of absorbing the exuded water.

In testimony whereof, I affix my signature.

GEORGE HILLARD BENJAMIN.